(12) United States Patent
Besuchet

(10) Patent No.: US 7,260,446 B2
(45) Date of Patent: Aug. 21, 2007

(54) TEMPERATURE PROTECTION METHOD FOR MACHINE TOOL

(75) Inventor: Jean-Philippe Besuchet, Neuchâtel (CH)

(73) Assignee: Mikron Agie Charmilles AG, Nidau (CH)

( * ) Notice: Subject to any disclaimer, the term of this patent is extended or adjusted under 35 U.S.C. 154(b) by 0 days.

(21) Appl. No.: 11/344,791

(22) Filed: Jan. 31, 2006

(65) Prior Publication Data

US 2006/0178761 A1 Aug. 10, 2006

(30) Foreign Application Priority Data

Feb. 8, 2005 (EP) ................................. 05002582

(51) Int. Cl.
*G06F 19/00* (2006.01)
*G06F 15/00* (2006.01)
*G06F 11/30* (2006.01)
*G06F 11/00* (2006.01)
*G05B 11/01* (2006.01)
*G05B 9/02* (2006.01)
*G05D 23/00* (2006.01)
*G08B 17/00* (2006.01)
*G08B 21/00* (2006.01)

(52) U.S. Cl. ..................... 700/176; 700/21; 700/80; 700/108; 700/177; 700/299; 702/99; 702/132; 702/185; 702/199; 714/2; 714/25; 714/47; 714/57; 340/584; 340/680

(58) Field of Classification Search ............... 700/17, 700/21, 28–30, 79, 80, 83, 108–110, 174–177, 700/180, 299; 702/99, 130, 132, 136, 179, 702/182–185, 189, 199; 714/1, 2, 25, 37, 714/57, 46–48; 340/584, 679, 680, 682

See application file for complete search history.

(56) References Cited

U.S. PATENT DOCUMENTS

| 4,207,567 A * | 6/1980 | Juengel et al. .............. 340/680 |
| 4,757,307 A * | 7/1988 | Keramati et al. ........... 340/680 |
| 4,922,230 A * | 5/1990 | Ohtani et al. ............... 340/577 |
| 5,150,102 A * | 9/1992 | Takashima .................. 340/584 |
| 5,740,081 A * | 4/1998 | Suzuki ........................ 702/94 |
| 6,508,614 B1 * | 1/2003 | Ozaki et al. ................. 409/231 |
| 6,540,021 B1 * | 4/2003 | Botrel ................... 166/250.08 |
| 6,633,379 B2 * | 10/2003 | Roesner et al. ............. 356/301 |
| 6,845,340 B2 * | 1/2005 | Edie et al. .................. 702/179 |
| 7,095,235 B2 * | 8/2006 | Fiebig et al. ................ 324/417 |
| 7,130,769 B1 * | 10/2006 | Allen et al. ................. 702/184 |
| 2005/0278319 A1 * | 12/2005 | Karklins et al. ............... 707/3 |
| 2006/0012783 A1 * | 1/2006 | Flaig ....................... 356/239.2 |

FOREIGN PATENT DOCUMENTS

| DE | 1004052499 A1 * | 7/2006 |
| EP | 369220 A2 * | 5/1990 |
| JP | 04351445 A * | 12/1992 |
| JP | 06315247 A * | 11/1994 |
| JP | 2002346884 | 12/2002 |

\* cited by examiner

*Primary Examiner*—Crystal J. Barnes
(74) *Attorney, Agent, or Firm*—Bachman & LaPointe, P.C.

(57) ABSTRACT

A method of protecting a rotating device, loaded by temperature of a machine tool with one temperature sensor on that device and a temperature bloc, comprising the steps of inputting specific parameters in the temperature bloc, estimating a value for the device temperature increase caused by the activity of the device and measuring the temperature of the device.

8 Claims, 4 Drawing Sheets

TEMPERATURE PROTECTION METHOD FOR MACHINE TOOL

BACKGROUND OF THE INVENTION

The invention relates a method of protection of a rotating device of a machine tool, loaded by temperature, with one temperature sensor on that device and a temperature bloc.

The method of the present invention is able to detect early on patterns which will help protect a device against degradation due to lubrication defects and to accurately detect and diagnose failure and miss handling of the device. Device means all parts of machine tools, which are loaded by temperature, caused by incorrect cooling, lubrication etc.

For example the device is a spindle of a high speed milling machine. The lubrication system of a spindle can fail and that often leads to a spindle failure. This invention provides the opportunity to warn the customer that something is wrong and allows to save the spindles which would have otherwise failed reducing the cost of repair. Furthermore the invention provides means for the customer to recognise his mistake and correct for it before damage is caused.

The producer has the possibility, for example after a failure under the warranty time, to conduct a detailed analysis of the spindle in order to diagnose the cause of failure.

For example there is known in the prior art (JP 2002346884 A) to detect abnormality or end of service life of a spindle in a machine tool, in advance. Data of temperature rise of the spindle bearing is recorded linking with the running data such as date and time occurred, spindle speed and spindle motor load, and they are output on a display as a data table when necessary. Besides effective peak data of temperature rise is selected, the effective peak data is recorded linking with the running data, the recorded data for a day is reserved sorting in the order of the peak level, and the reserved data is shown on the display as a data table.

The object of the invention is to provide a method which will help protect the spindle against degradation due to lubrication defects and improve the ability to accurately detect and diagnose failure and mishandling of the spindle.

SUMMARY OF THE INVENTION

The object is achieved by providing a method which comprises the following steps: inputting specific parameters in the temperature bloc, estimating a value for the spindle lower bearing temperature increase caused by the spindle activity, measuring the temperature of the spindle lower bearing temperature, ironing out the normal discrepancy between the model and the measurement and generating an event signal when the resulting difference signal goes above a trigger level.

The preferred method comprises the further steps of: providing a temperature offset by a moving average of the difference between the estimated and the measured temperature and re-offsetting by this offset so that the measured temperature is comparable to the re-offset value.

To predict spindle lubrication, cooling failures etc. a model is used which supervises the spindle activity to predict the expected temperature in the spindle lower bearing. The value calculated by the model is then compared to the actual temperature. Any significant and long lasting difference indicates a likely failure.

After detection an event is logged by the control with sufficient information for later diagnose and notifies the customer providing him a suggested course of action. The customer has then the possibility to further analyse the data using a trend graph showing the calculated value and the measured value over time.

BRIEF DESCRIPTION OF THE DRAWINGS

The method will now be described, by way of example, with reference to the accompanying graphs, figure and diagrams, in which show FIG. 1 a vertical type of a machine tool
FIG. 2 a graph of the temperature in a spindle lower bearing
FIG. 3 a bloc diagram of the method
FIG. 4 an example of a "good" measurement
FIG. 5 an example of a "bad" measurement

DETAILED DESCRIPTION

Figure 1:
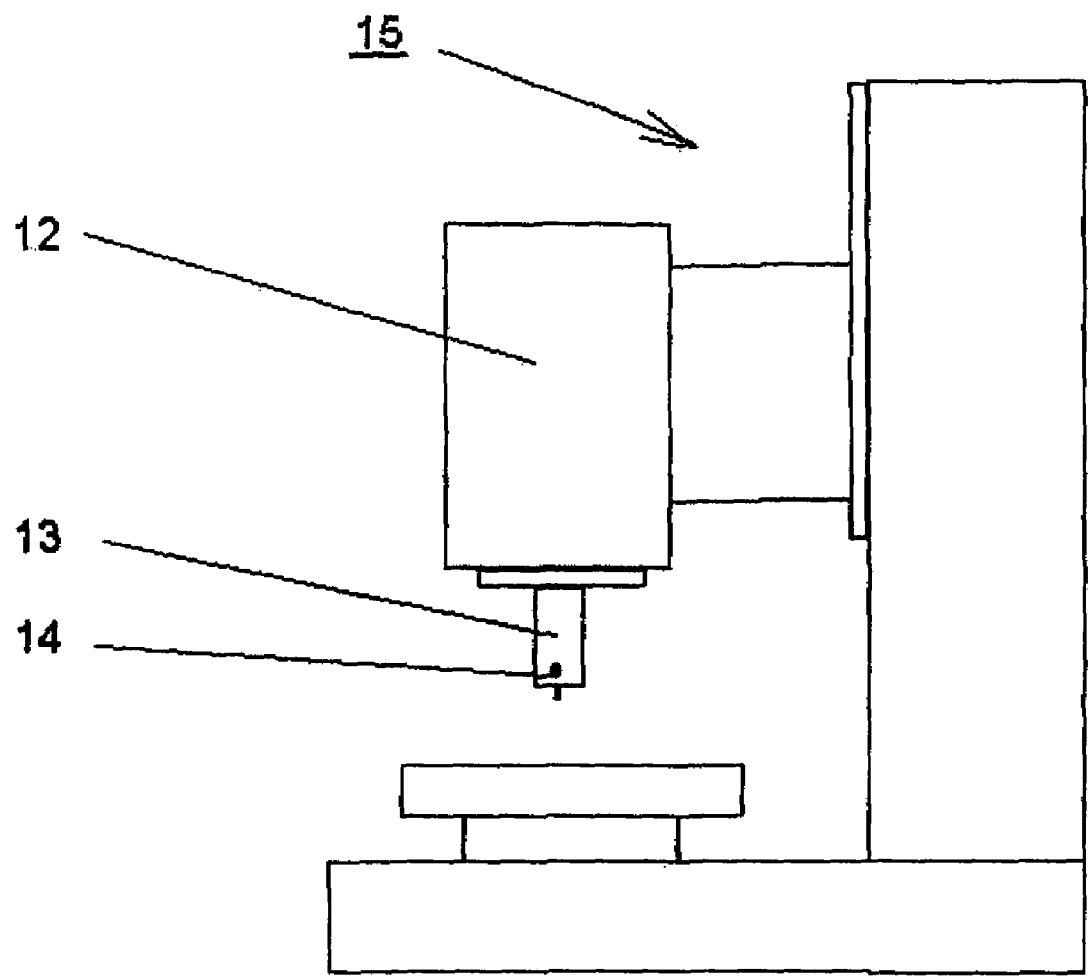

As shown in FIG. 1, the vertical machine tool 15 consists of a spindle head 12, and a spindle 13. At the lower bearing of the spindle 13 a sensor 14 is attached. The sensor 14 measures the temperature of the lower bearing of the spindle 13.

Figure 2:
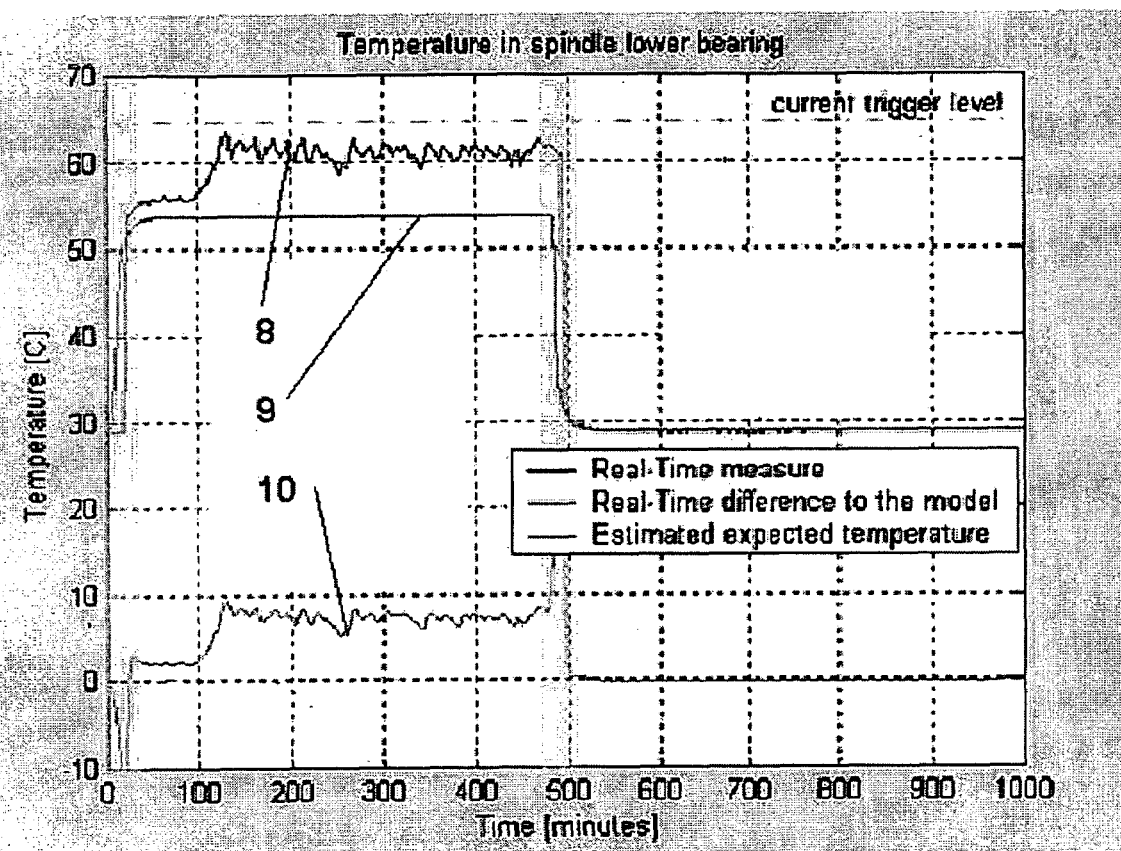

The graph in FIG. 2 shows a measure where the measured temperature by the sensor 14 goes out of its usual trend. In this case, it was later discovered how the spindle lubrication failure is reported (see FIGS. 4 and 5). In FIG. 2 the curve 8 represents the real-time measure and the curve 9 the estimated temperature. The curve 10 results in the difference of curve 8 minus curve 9.

When the machine is started the invented spindle protection system (hereinafter SPS) must be initialized and the machine warmed up. During this phase the SPS can not operate properly since the model is not aligned to the actual state of the machine. The SPS activation event is generated as soon as the first 10 operating minutes are over and the resultant SPS event1 signal is inactive.

Figure 3:
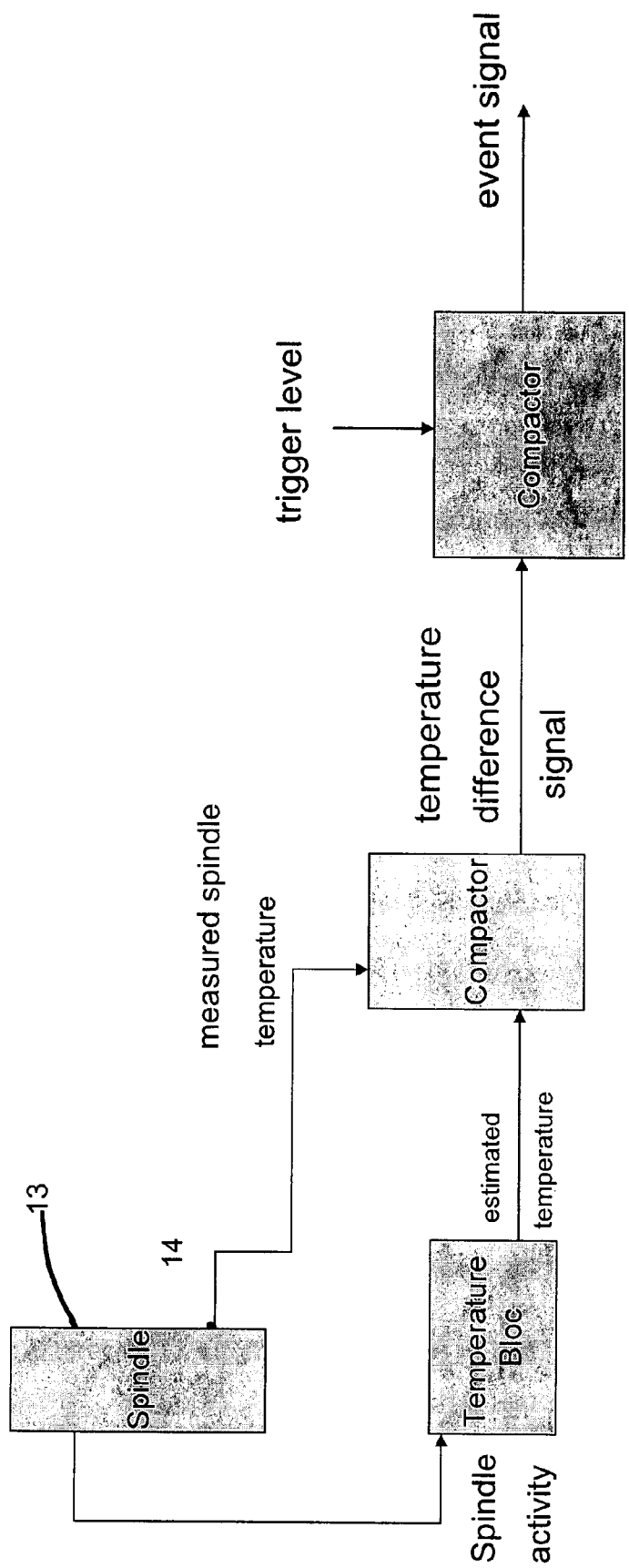

In a first step the SPS detects two kinds of an event indicating a spindle issue. The diagram in FIG. 3 shows how these events are detected:

The temperature bloc calculates with spindle input parameters an estimated value for the spindle lower bearing temperature increase caused by the spindle activity. It varies typically from 0° C. (idle spindle) to about 25° C. (100% spindle speed). A moving average of the difference between the estimated temperature and the measured temperature provides a temperature offset (the expected measured temperature at 0 speed). This temperature offset is used to re-offset the measured temperature increase from about 28° C. to about 0° C. so that the estimated temperature can be compared to the re-offset value. A moving average is used to iron out normal discrepancy between the model and the measure. Once the resulting signal goes above a trigger value, a SPS event1 is generated indicating a possible issue.

In case of troubles the end customer needs to be able to overlap the measured temperature with the one calculated by the system using the graphing function. Since the offset of the spindle temperature can vary from one machine to another and is also affected slightly by the machines environment temperature and machine activity, one needs to be able to manually re-offset the calculated temperature by a specific constant input by the customer so that the two curves 1 and 2 (see FIG. 4) curves overlap perfectly. This comparison is used to decide whether the customer should proceed with the spindle, should anticipate to stop the work in a later time or stop right away. The default temperature offset should be 28° C. for the calculated generated signal.

In order to shorten the initialization phase of the SPS after a reset, the offset moving average is initialized to −28° C. (typical offset).

The absolute difference between the model and the measure is not relevant to the SPS. This is a difference in the trend which indicates failure.

Figure 4:
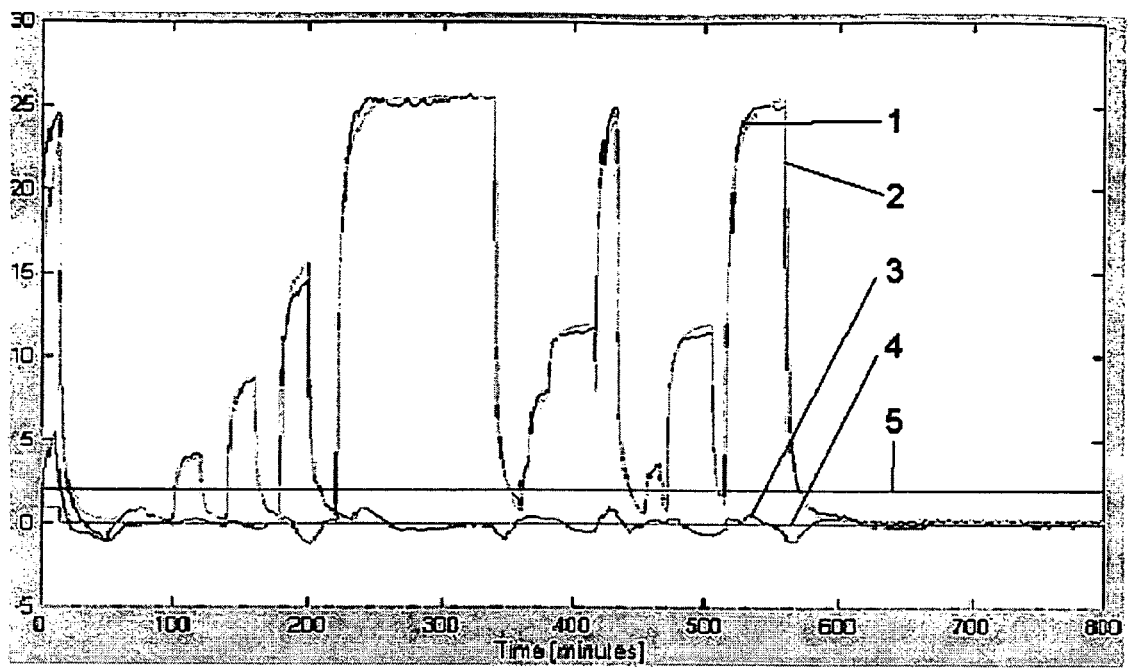

An example of a measurement of a working spindle whose behavior has expected is shown in FIG. 4. With a moving average depth of 50 minutes on the offset calculation and a depth of 10 minutes on the SPS, the simulation result provided on a "good" result.

The curve 2 means the estimate model temperature increase, the curve 1 the measured re-offset and the curve 3 the difference curve of curve 1 minus curve 2. The trigger level 5 is set to 2° C. The curve 4 represents the event1 signal 4, which is constant in the graph of FIG. 4, because the behavior of the spindle is correct.

Figure 5:
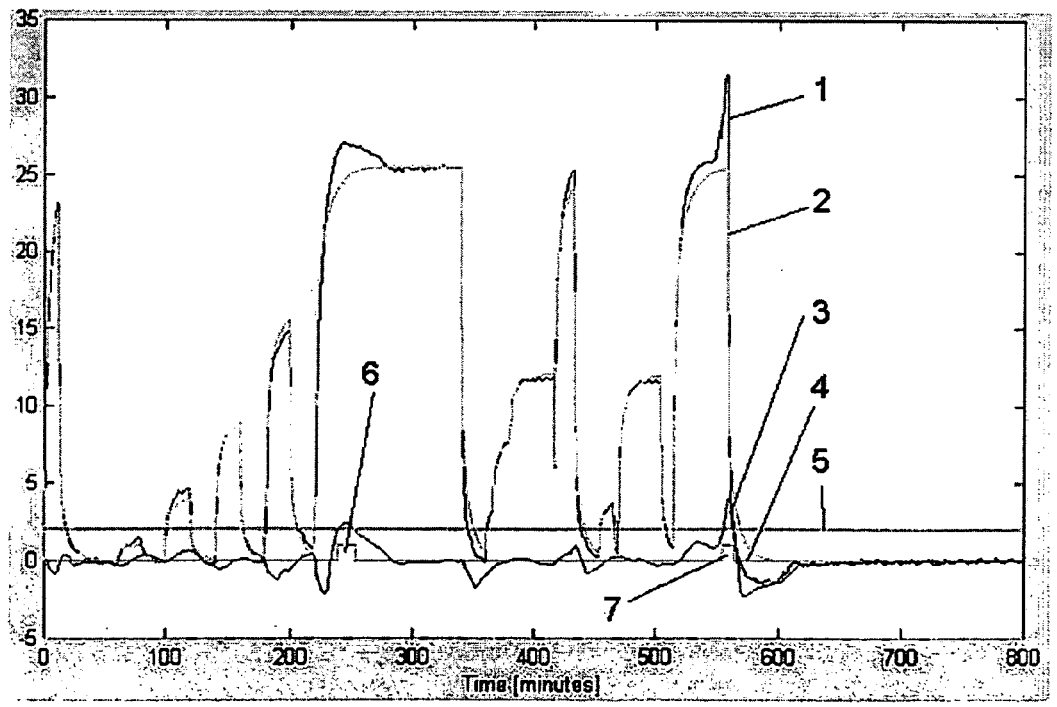

The FIG. 5 shows the work of the SPS on a "bad" measurement:

The curves have the same meaning like in FIG. 5. But the curve 4, which represents the event1 signal of the SPS has two error rectangular detections 6 and 7 at about 240 minutes and 580 minutes. At these positions the difference curve 3 passes over the trigger curve 5 at 2° C. The event1 is able to create either a warning message or an error message combined with a stop action.

Once the SPS event1 has been detected, a warning message is displayed to the customer. The warning text is something similar to "Warning: Spindle protection system event detected".

Furthermore a cause description text can be displayed like: "Failing lubrication system", "Resonating spindle bearing", "Defective temperature sensor", "Atypical machine operation", "SPS miss calibrated or miss functioning" etc.

Also it is possible displaying remedy messages like "vary the spindle speed", "Check the spindle lubrication line", "Check the Trend Graph comparing the calculated and measured spindle bearing temperature" etc.

The advantage of the invention is getting a dependable machine tool. A spindle failure is a major disruption of the processes of such machine tools.

In case no repair is possible, knowing in advance that the spindle is likely to fail it is also of great advantage to the customer. It provides him the opportunity to plan for a process interruption minimizing the cost of the disruption.

The lubrication system can fail and this often leads to spindle failure. Having the opportunity to warn the customer that something is wrong will allow to save spindles which would have otherwise failed reducing drastically the cost of the repair.

The SPS provides means for the customer to recognize the mistake and correct for it before damage are caused. With the invention a detailed analysis of the spindle function is possible in order to diagnose the cause of the failure.

This invented method is able to generate a model temperature unlike to the prior art which disclose a teaching or recording phase for each workpiece to be machined. With this invention the customer does not need to do anything. The customer does not need to do anything special. He can work and in case of failures the described method will notify him. In the prior art the customer needs to record the reference temperature profile for the spindle each time he works on a new workpiece geometry or change any parameter affecting the milling strategy. Because of this the invented method can function on the very first workpiece of a lot one piece on a specified machine equipped with the present method. This is applicable for example for die and mold technology where the workpieces lot is seldom more than 20 and often only one.

The invention claimed is:

1. A method of protection of a rotating device, affected by temperature of a machine tool with one temperature sensor on that device and a temperature bloc, comprising the steps of
   (a) inputting specific parameters of device activity in the temperature bloc;
   (b) estimating a value for the device temperature increase resulting from the activity of the device;
   (c) measuring the temperature of the device;
   (d) compensating for normal discrepancy between the estimated temperature value and the measured temperature value;
   (e) comparing the temperatures from step (d) to obtain a difference signal;
   (f) providing a temperature offset by a moving average of the difference between the estimated and the measured temperature;
   (g) re-offsetting the measured temperature and comparing the estimated temperature value to the re-offset value; and
   (h) generating an event signal when the difference signal goes above a trigger level.

2. A method of claim 1, wherein the device is a spindle of a machine tool.

3. A method of claim 2, wherein a temperature sensor is arranged at a bearing of the spindle.

4. A method of claim 1, including generating a failure analysis in order to diagnose the cause of the failure.

5. A method of claim 1, displaying information messages.

6. A method of claim 5, displaying warning messages about potential failure.

7. A method of claim 6, displaying remedy messages.

8. A method of claim 1, generating the re-offset manually.

* * * * *